United States Patent [19]

Black

[11] Patent Number: 5,388,473
[45] Date of Patent: Feb. 14, 1995

[54] BEARING ARRANGEMENT FOR HEAVY DUTY MARINE TRANSMISSION

[75] Inventor: James B. Black, Roscoe, Ill.

[73] Assignee: Twin Disc Incorporated, Racine, Wis.

[21] Appl. No.: 142,982

[22] Filed: Oct. 29, 1993

[51] Int. Cl.$^6$ .................................................. F16H 3/14
[52] U.S. Cl. ........................................... 74/361; 74/333
[58] Field of Search ............ 74/361, 376, 377, 412 R, 74/319, 322, 323, 333; 192/70.28; 384/626; 440/75

[56] References Cited

U.S. PATENT DOCUMENTS

| | | | |
|---|---|---|---|
| 3,570,319 | 3/1971 | Arnold | 192/0.09 |
| 3,613,469 | 10/1971 | McRoberts et al. | 74/361 |
| 3,803,934 | 4/1974 | Yokel | 74/361 |
| 3,823,801 | 7/1974 | Arnold | 192/87.19 |
| 3,946,841 | 3/1976 | LaFollette et al. | 74/378 X |
| 4,451,238 | 5/1984 | Arnold | 440/74 |
| 4,676,356 | 6/1987 | Beccaris et al. | 192/70.28 |
| 4,802,564 | 2/1989 | Stodt | 192/70.28 |
| 5,151,059 | 9/1992 | Higby | 74/378 X |
| 5,199,317 | 4/1993 | Moore et al. | 74/361 |

FOREIGN PATENT DOCUMENTS

702358  4/1931  France ................................ 74/333

OTHER PUBLICATIONS

"Standard Handbook of Machine Design", Shigley and Mischke, pp. 27.6–27.13, McGraw-Hill, 1986.

Twin Disc Bulletin 319-S-14C, *Model MG-514C Marine Transmission*, 1989.
Twin Disc Bulletin 319-W-16, *Models MG-516 & MG-5161 Marine Transmissions*, 1991.

Primary Examiner—Dirk Wright
Assistant Examiner—Khoi Q. Ta
Attorney, Agent, or Firm—Nilles & Nilles

[57] ABSTRACT

A bearing arrangement for the drive pinion of a marine transmission or the like reduces deflections of the shaft on which the pinion is mounted. The bearing arrangement mounts the pinion in part on the shaft and in part directly on the transmission housing, thus reducing loads imposed on the shaft by the pinion. The bushing which typically supports the pinion on the drive shaft is eliminated in favor of a first bearing supporting the input end of the pinion in the housing and a second bearing supporting the output end of the pinion on the shaft. Third and fourth bearings support the output and input ends of the shaft in the housing and on the pinion, respectively. Preferably, the first, second, and third bearings comprise single taper roller bearings which permit the points at which the effective loads are imposed on the shaft to be shifted and the running clearances of which are adjusted by a single shim pack. Deflections can be reduced still further by positioning the clutch return spring proximate an outer surface of the clutch.

29 Claims, 5 Drawing Sheets

BEARING ARRANGEMENT FOR HEAVY DUTY MARINE TRANSMISSION

BACKGROUND OF THE INVENTION

The invention relates to marine gear type transmissions and, more particularly, relates to bearing arrangements for supporting pinions of heavy duty marine transmissions on rotary shafts.

DISCUSSION OF THE RELATED ART

Marine gears or marine transmissions for transmitting torque from the engines to the output shafts of marine power trains are well known. Such transmissions typically include first and second drive systems capable of driving an output shaft to rotate in engine and anti-engine directions upon actuation of respective clutches. The "engine" direction may result in reverse propulsion, and the "anti-engine" direction may result in forward propulsion. However, this designation tends to be confusing, so "engine" and "anti-engine" directions are usually referred to as "forward" and "reverse" respectively, and will hereafter be referred to as such for the sake of convenience.

One such marine transmission is disclosed in U.S. Pat. No. 3,803,934 to Yokel. Referring to FIG. 1, a marine transmission 10 of the type disclosed in the Yokel patent is mounted in a housing 40 and transfers torque from a drive spider 14 or the like to an output shaft 16. A forward drive system 11 including a shaft 12 is coupled to the drive spider 14 and selectively drives the output shaft 16 to rotate in a forward direction upon the actuation of a clutch 18. A reverse drive system includes a drive shaft (not shown) which is coupled to the forward drive shaft 12 and which selectively drives the output shaft 16 to rotate in a reverse direction upon actuation of a second clutch (also not shown).

The forward drive system 11 includes the drive shaft 12, the clutch 18, and a pinion 30. Clutch 18 is mounted on the shaft 12, is of the hydraulically actuated, interlevered friction plate type, and includes a clutch actuation chamber 22 which can be pressurized with fluid in a known manner to translate a piston 24. Clutch 18 additionally includes a drum 20, a piston 24, a clutch stack formed from opposed plates 26, 28, and a backup plate 34. Drum 20 is fixed to the shaft 12 for rotation therewith and includes a gear portion 32 which is coupled to a mating gear portion of the second clutch to drive the reverse shaft to rotate. Piston 24 is designed to translate upon admission of pressurized fluid into the actuating chamber 22 to compress together the interlevered friction plates 26 and 28 fixed respectively to the interior of the drum 20 and to the pinion 30. Backup plate 34 is fixed to the drum 20, and a return spring 36 engages the piston 24 for disengaging the clutch when the actuating chamber 22 is depressurized.

Pinion 30 is rotatably mounted on the shaft 12 by a bushing 38 attached to the pinion 30 by an interference fit, and shaft 12 is in turn rotatably journaled in the housing 40 by respective fore and aft bearings 42 and 44. Pinion 30 is of the helical taper type and has a first end supporting the clutch plates 26 and a second forming a hub 50 presenting teeth 52. The teeth 52 have a taper converging towards the clutch 18 and mesh with the teeth of a mating tapered helical gear 46 fixed to output shaft 16.

In use, to drive the shaft 16 to rotate in a forward direction, pressurized hydraulic fluid is fed into chamber 22 from a selectively pressurizable passage 49 via a longitudinal bore 48 formed in shaft 12, thus driving the piston 24 towards backup plate 34 against the force of return spring 36. Translation of the piston 24 compresses the plates 26 and 28 to drive the pinion 30 to rotate. Rotation of pinion 30 transfers torque from the drive spider 14 to the gear 46 of shaft 16, thus rotating the shaft in a forward direction. Radial loads imposed on the pinion 30 by the gear 46 are transferred through the bushing 38 to the drive shaft 12 and are absorbed by bearings 42 and 44 journaling the shaft 12 in the housing 40. Axial (thrust) loads, arising due to the helix angle on the teeth 54 of gear 46, are transferred to the shaft 12 through thrust bearings 56, 58.

The marine transmission 10 disclosed by Yokel presents certain limitations rendering it unsuitable for some applications in which high torque transfer is involved. For instance, marine transmissions are typically designed so as to minimize their size and weight. The outer diameter of pinion 30, the outer diameter of shaft 12, and the thickness of the hub 50 separating the teeth 52 of pinion 30 from the shaft 12 are thus made as small as possible while still presenting adequate strength to bear the loads imposed on the system. These decreased sizes result in excessive deflections and bending of the shaft 12 from given loads on the system. Since the pinion 30 and bushing 38 are positioned by the shaft 12, shaft deflections result in an offset and an angular misalignment 1) at the point at which the teeth 42 and 54 of the pinion 30 and gear 46 mesh, 2) at the contact point of the driving teeth at the inside diameter of the clutch stack and the mating teeth on the pinion 30, and 3) in the working elements of the bearings 42 and 44. In all cases, due to the misalignment, the working loads are not distributed over their design areas but are concentrated into smaller areas with resulting higher stresses and shorter life. While these problems could be alleviated by increasing the size of the shaft 12 and/or the pinion 30, the resulting increase in size and weight of the transmission 10 would render the transmission unsuitable for many applications. Use of the transmission 10 is therefore limited to applications which impose relatively small loads on the pinion 30 which do not result in excessive distortion of the pinion 30 or deflection of the shaft 12.

Some of the problems associated with the Yokel patent could be avoided by supporting the pinion in the housing rather than on the shaft. One such system is disclosed in U.S. Pat. No. 2,851,895 to Aschauer. However, the system disclosed by Aschauer requires additional housing walls at the center of the shaft to support the pinion. Such additional walls undesirably increase both the size and the weight of the overall gear assembly.

OBJECTS AND SUMMARY OF THE INVENTION

It is therefore an object of the invention to provide a bearing arrangement for a marine transmission or the like which is relatively compact and lightweight and yet which is capable of absorbing relatively high loads without excessive shaft deflection and pinion distortion.

Another object of the invention is to eliminate the bushings typically used to support the pinion on the drive shaft while at the same time maintaining a compact, lightweight construction.

In accordance with a first aspect of the invention, these objects are achieved by providing a transmission including a housing, a rotatable drive shaft at least partially disposed in the housing, a pinion disposed around the drive shaft, and a bearing arrangement via which the pinion is 1) partially supported on the drive shaft, and 2) partially supported directly in the housing. Preferably the bearing arrangement includes a first bearing disposed between the pinion and the housing and rotatably supporting the pinion in the housing, and a second bearing disposed between the pinion and the shaft and rotatably supporting the pinion on the shaft. A third bearing is preferably disposed between a first end of the shaft and the housing and rotatably supports the shaft in the housing, and a fourth bearing is preferably disposed between a second end the shaft and the pinion and rotatably supports the shaft in the housing through the pinion and the first bearing.

Preferably, the pinion is elongated and has a first end portion positioned adjacent an end wall of the housing and a second end portion supporting a portion of the clutch. The first bearing is in this case positioned between an outer radial periphery of the first end portion of the pinion and the housing, and the second bearing is located between an inner radial periphery of the second end portion of the pinion and an outer radial periphery of the drive shaft.

If the clutch comprises a hydraulically actuated piston which engages the clutch and a return spring for biasing the piston towards a position disengaging the clutch, either of two bearing designs are preferably employed. In the first design, the second end portion of the pinion is cantilevered to define a space between the inner radial periphery of the pinion and the outer radial periphery of the drive shaft, the space having inner and outer longitudinal ends receiving the second bearing and the return spring, respectively. In the second design, the return spring is positioned radially beyond an outer radial periphery of the pinion, and the second bearing is positioned proximate an outer longitudinal end of the second end portion of the pinion.

Still another object of the invention is to simplify the assembly of a gear assembly of a transmission.

In accordance with another aspect of the invention, this object is achieved by providing a transmission including a housing, a rotatable drive shaft, a pinion which is disposed around the drive shaft and which is rotatable with respect to the drive shaft, and a bearing arrangement rotatably supporting the pinion and the drive shaft in the housing. The bearing arrangement includes three taper roller bearings. A single shim pack adjusts the running clearance of all three taper roller bearings. Preferably, the bearing arrangement comprises a first bearing disposed between the pinion and the housing and rotatably supporting the pinion in the housing, a second bearing disposed between the pinion and the drive shaft and rotatably supporting the pinion on the drive shaft, and a third bearing disposed between the drive shaft and the housing and rotatably supporting the drive shaft in the housing.

Yet another object of the invention is to provide a method of reducing deflections of and bending moments imposed on the drive shaft of a transmission.

In accordance with another aspect of the invention, this object is achieved by imposing a load on a pinion of the transmission, the pinion being disposed around the drive shaft and being rotatable with respect to the drive shaft, and transferring a portion of the load from the pinion directly to the shaft and the remainder of the load from the pinion to a housing in which the pinion and at least a portion of the shaft are disposed. Preferably, the step of transferring comprises transferring the portion of the load through a first bearing positioned between the housing and an outer radial periphery of a first end portion of the pinion, and transferring the remainder of the load through a second bearing positioned between an inner radial periphery of a second end of the pinion and an outer radial periphery of the shaft.

Other objects, features, and advantages of the present invention will become apparent to those skilled in the art from the following detailed description and the accompanying drawings. It should be understood, however, the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Resume

Pursuant to the invention, a bearing arrangement for the drive pinion of a gear train of a marine transmission or the like is provided which reduces deflection of the shaft on which the pinion is mounted. The bearing arrangement mounts the pinion in part on the shaft and in part directly in the transmission housing, thus reducing loads imposed on the shaft by the pinion. The bushing which typically supports the pinion on the drive shaft is eliminated in favor of a first bearing supporting the input end of the pinion in the housing and a second bearing supporting the output end of the pinion on the shaft. Third and fourth bearings support the output and input ends of the shaft in the housing and on the pinion, respectively. Preferably, the first, second, and third bearings comprise single taper roller bearings which permit the points at which the effective loads are imposed on the shaft to be shifted to reduce further deflections. Deflections can be reduced still further by positioning the clutch return spring proximate an outer surface of the clutch. The bearing arrangement also facilitates assembly by permitting the positioning of the first, second, and third bearings using a single shim pack.

System Overview of First Embodiment

Figure 1:
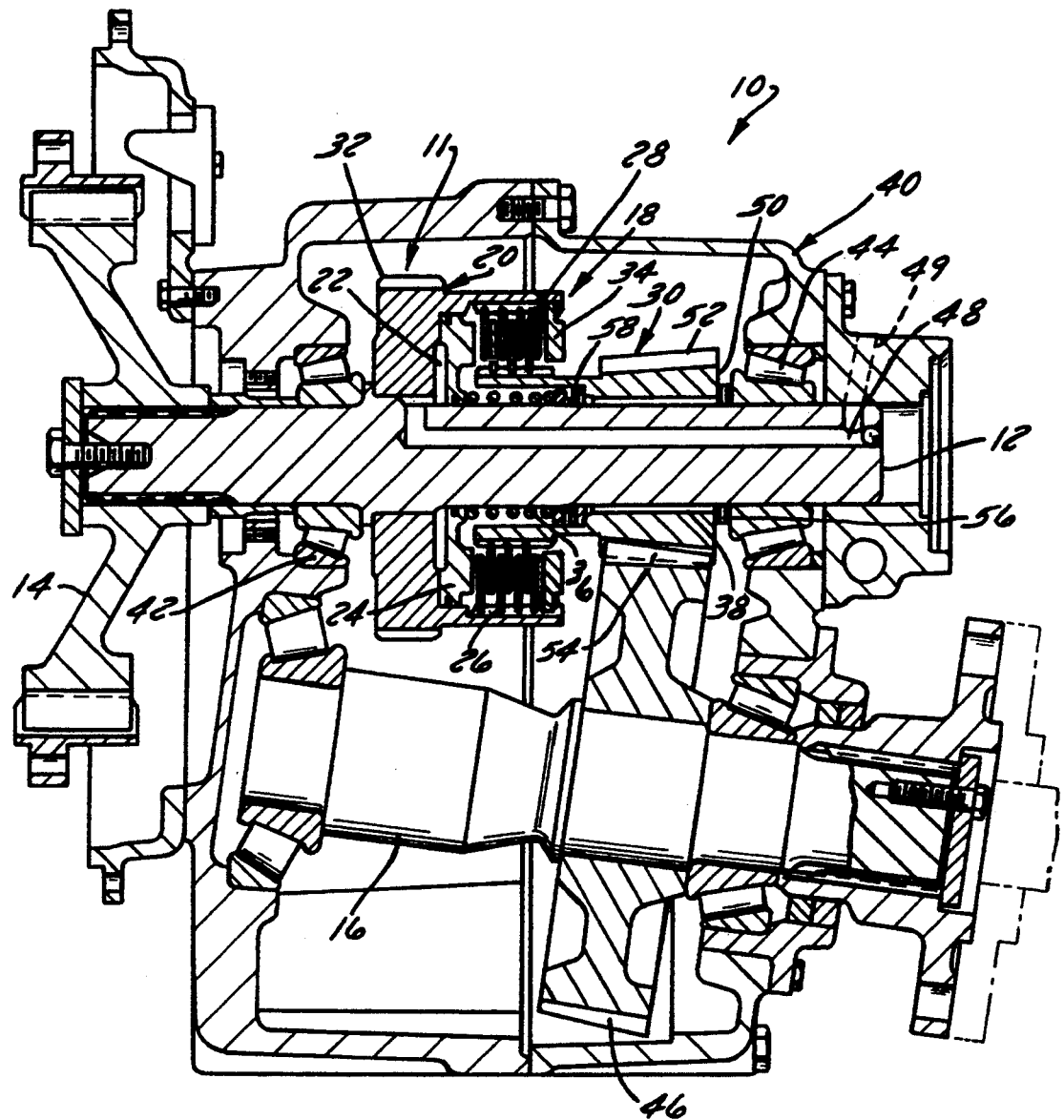
FIG. 1 is a sectional elevation view of a portion of a prior art marine transmission, appropriately labelled "PRIOR ART"
Figure 2:
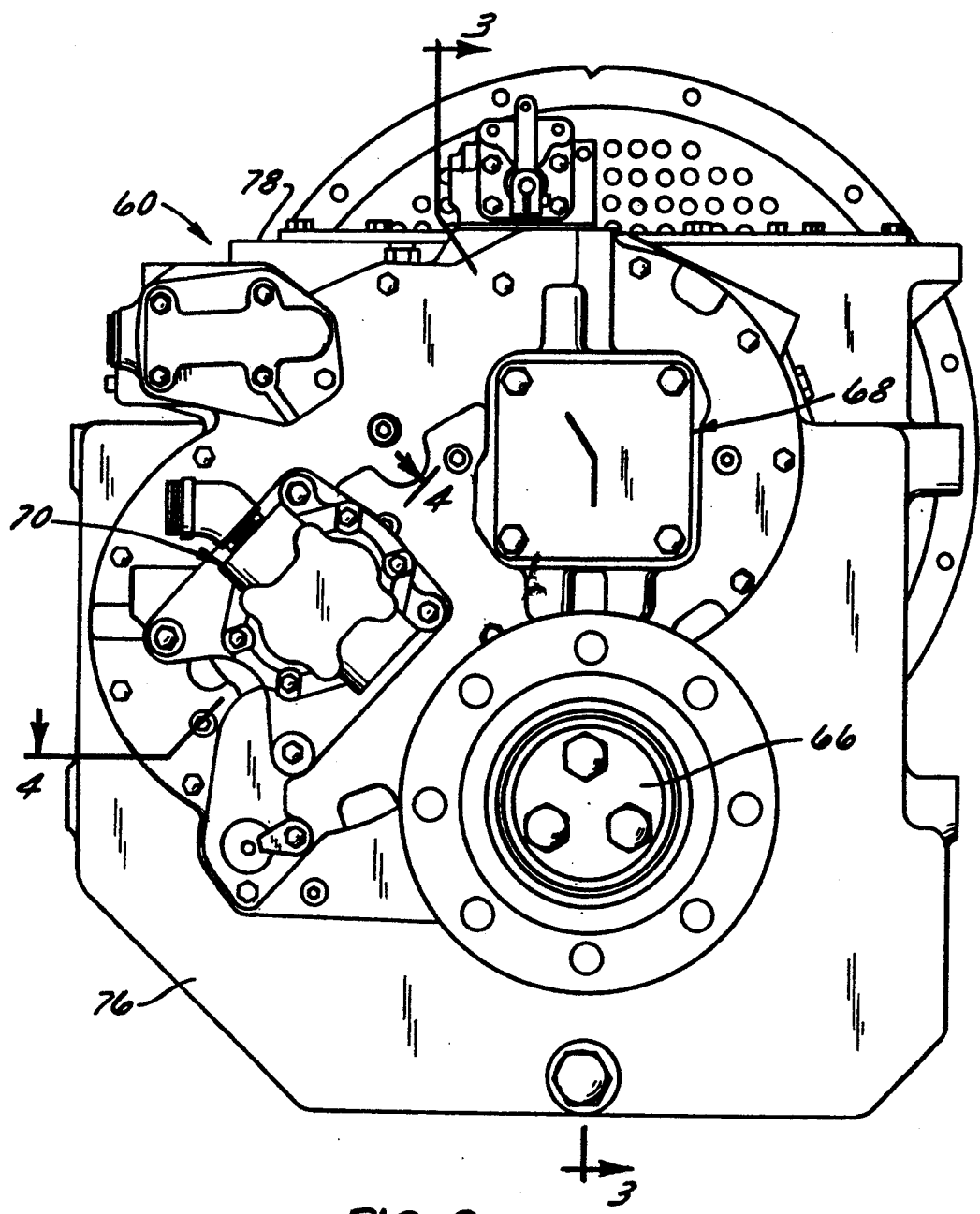
FIG. 2 is an end view of a marine transmission constructed in accordance with a first embodiment of the present invention.
Figure 3:
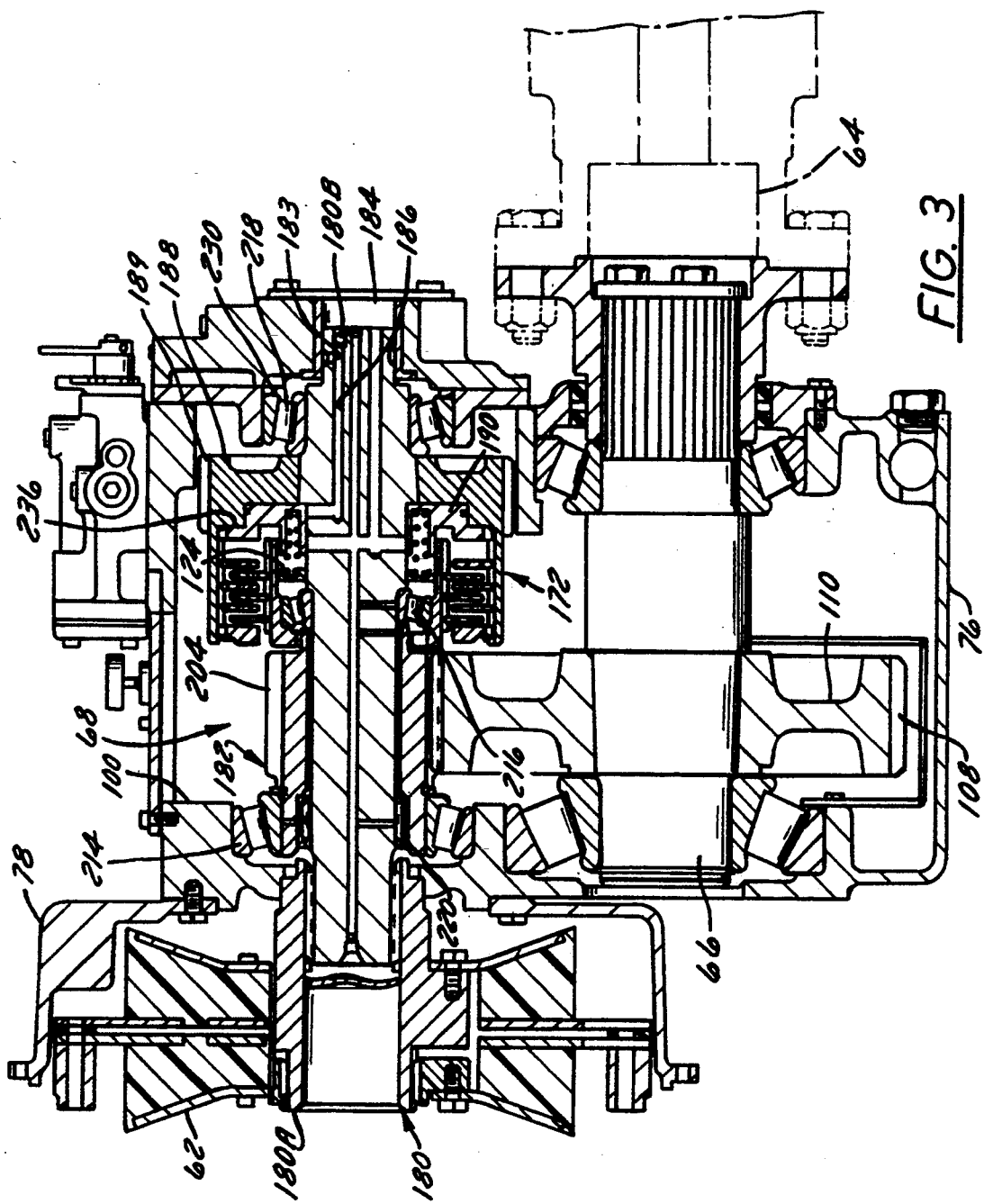
FIG. 3 is a sectional elevation view taken along the lines 3—3 in FIG. 2.
Figure 4:
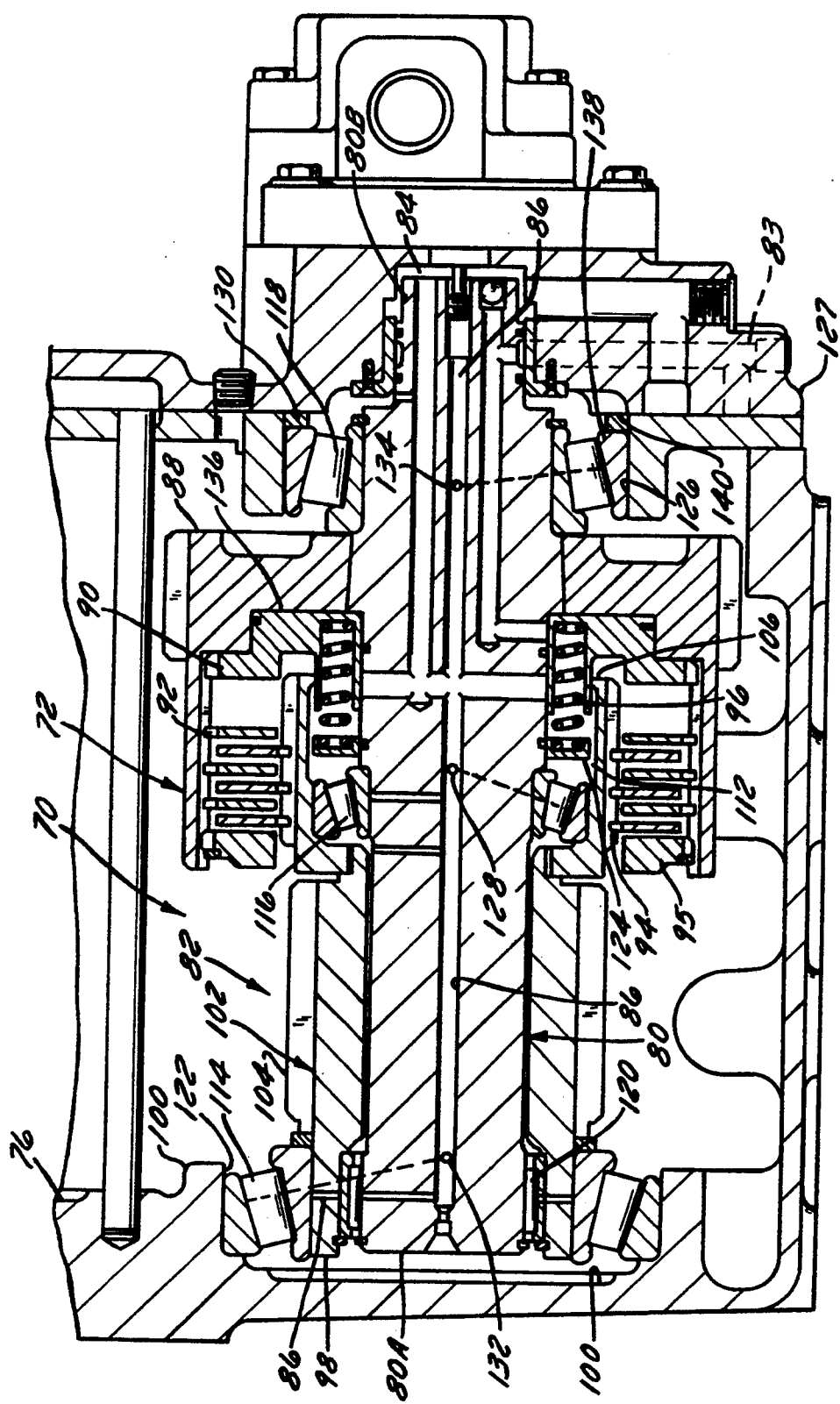
FIG. 4 is a sectional elevation view taken along the lines 4—4 in FIG. 2.

Referring now to FIGS. 2-4 of the drawings, the inventive bearing arrangement is provided in a marine transmission 60 delivering torque from a drive spider 62 to an output element 64 such as a propeller shaft. Marine transmission 60 includes an output shaft 66 and forward and reverse drive systems 68 and 70 which can be selectively coupled to the output shaft 66 by respective clutches 172 and 72 to drive the output shaft 66 in forward and reverse directions, respectively. The transmission including the marine transmission 60 is encased in a transmission housing 76 bolted or otherwise secured to a prime mover housing 78.

Reverse Drive System of First Embodiment

Referring to FIGS. 2 and 4, reverse drive system 70 includes a drive shaft 80, the first clutch 72, and a pinion 82. Shaft 80 and pinion 82 are mounted in the housing 76 by a bearing arrangement detailed below. Shaft 80 extends longitudinally within the housing 76 and has a front or second end 80A thereof located adjacent an end wall 100 of housing 76 and a rear or first end 80B in fluid communication with a passage 83 which can be selectively pressurized with hydraulic fluid in a manner which is, per se, well known to actuate the clutch 72. Shaft 80 also has bores 86 formed therein for supplying lubricating oil from a chamber 84 to the bearings, clutch plates, etc.

Clutch 72 is operable, upon actuation, to transmit torque from the drive shaft 80 to the pinion 82. Clutch 72 includes a drum 88 fixed to the shaft 80, a movable piston 90 for actuating the clutch, a clutch stack formed from opposed plates 92 and 94 (some of which are omitted for the sake of illustration) slidably mounted to the drum 88 and to the pinion 82, respectively, a backup plate 95, and a return spring 96.

Pinion 82 is disposed around the drive shaft 80 so as to be rotatable with respect to the shaft and so as to transfer torque to the output shaft 66 when the clutch 72 is actuated. Pinion 82 is elongated and has a first end portion 98 positioned adjacent the end wall 100 of housing 76, a central portion 102 presenting outer peripheral teeth 104, and a second end portion 106 to which are slidably attached the plates 94 of clutch 72. Teeth 104 preferably are spiral helical in shape and mesh with mating teeth 108 of a driven gear 110 which is in turn fixed to the output shaft 66. Second end portion 106 has an enlarged bore and is cantilevered from the end of the central portion 102 to define a chamber 112 between an inner radial periphery thereof and an outer radial periphery of the shaft 80 which receives the return spring 96.

Pursuant to the invention, the bearing arrangement for the pinion 82 and the shaft 80 is designed to transfer some of the loads imposed on the pinion 82 by the gear 110 directly to the housing 76 without adding additional housing walls and to transfer the remaining loads to the shaft 80 at a location tending to reduce bending moments on and deflection of the shaft. "Directly" as used herein does not mean that the bearing must be disposed in the housing with no elements therebetween. Rather, the term "directly" means that loads imposed on the first bearing 114 (detailed below) must be transferred to the housing 76 rather than to the shaft 80. Also, "directly" as used herein should not be confused with the terms "direct mounting" or "indirect mounting" which are sometimes used in the taper roller bearing art to designate a particular bearing orientation. For example, taper bearings mounting a pinion on a shaft such that their included angles open away from each other would provide an "indirect" mounting of the bearings on the shaft as this term is understood to those skilled in the bearing art but would still mount the pinion "directly" on the shaft.

The bearing arrangement includes first through fourth bearings 114, 116, 118, and 120. The first and second bearings 114 and 116 support the pinion 82, and the third and fourth bearings 118 and 120 support the shaft 80. First bearing 114 is disposed between the first end portion 98 of pinion 82 and a bore 122 formed by a step in the end 100 of housing 76. Second bearing 116 is disposed in the chamber 112 proximate a fixed plate 124 supporting the end of return spring 96. Third bearing 118 is disposed between a bore 126 of a second end 127 of the housing 76 and the outer periphery of the second end portion 80B of the shaft 80. Fourth bearing 120 is disposed between an outer periphery of the inner end portion 80A of the shaft 80 and an inner periphery of the first end portion 98 of the pinion 82. First and third bearings 114 and 118 present included angles opening towards each other so as to shift loads imposed on the shaft 80 by these bearings towards the axial center of the shaft. It should be understood, however, that the bearings 114 and 118 could if desired present included angles opening away from one another.

In addition to reducing the loads imposed on the shaft 80 by the pinion 82, the first, second, and third bearings 114, 116, and 118 are designed to shift the effective points at which the remaining loads are imposed on the shaft 80 so as to minimize deflection and bending of the shaft. To this end, the bearings 114, 116, and 118 are provided in the form of single taper roller bearings which, as is known in the art, are seated in their races at angles so as to transmit loads orthogonally to the longitudinal surfaces of the bearing cups or outer races rather than radially. Thus, in the case of the second bearing 116, the load from the bearing is effectively imposed on the shaft 80 at a point 128 positioned axially between the radial center of bearing 116 and the second end portion 80B of the shaft 80. The reaction loads from bearings 114 and 118 are similarly effectively imposed at points 132 and 134 offset from the radial centers of the bearings. Bearing 120 is a standard cylindrical bearing and thus transmits its load directly to bearing 114.

Due to the arrangement of the bearings 114, 116, and 118, all three bearings can be positioned during assembly by a single shim pack 130 located between the outer axial end face 138 of bearing 118 and the adjacent inner end face 140 of the end 127 of housing 76. This arrangement thus considerably simplifies assembly since standard taper roller bearing arrangements require that each pair of bearings be positioned by a separate shim pack.

Forward Drive System of First Embodiment

Forward drive system 68 is nearly identical in construction to the reverse drive system 70. Accordingly, elements of the forward drive system 68 corresponding to those of reverse drive system 70 have been designated by the same reference numerals incremented by 100.

Referring now to FIGS. 2 and 3, forward drive system 68 includes a drive shaft 180, a pinion 182, and the second clutch 172. Forward drive system 68 differs structurally from reverse drive system 70 detailed above primarily in that the second or forward end 180A of shaft 180 extends through the end wall 100 of transmission housing 76 and is coupled to the drive spider 62. The remote or second end 180B of shaft 180 cooperates with a passage 183 which can be pressurized independently of passage 83 described above to selectively supply pressurized fluid to bores 186 formed in the shaft 180 to actuate the clutch 172. Lubricating oil is supplied from a chamber 184 to the bearings, clutch plates, etc. Clutch 172, like the clutch 72, includes a drum 188 fixed to shaft 180, and a hydraulically actuated piston 190 for actuating the clutch. Drum 188 has outer peripheral teeth 189 which mesh with corresponding teeth 89 on drum 88 (FIG. 4) to drive the reverse shaft 80. Pinion 182, like the pinion 82 of the reverse drive system 70, has opposed end sections flanking a central section presenting outer peripheral teeth 204 mating with the teeth 108 of gear 110.

The bearing arrangement for the forward drive system 68 is likewise identical to that of the reverse drive system 70 and includes first through fourth bearings 214, 216, 218, 220 arranged as described above with respect to the bearing arrangement for the reverse drive system. The first, second, and third bearings 214, 216, and 218 are positioned during assembly by a single shim pack 230.

Operation of First Embodiment

In operation, drive shaft 180 for the forward drive system 68 is driven to rotate at all times by rotation of drive spider 62. Shaft 80 for the reverse drive system 70 is likewise driven to rotate by the clutch drums 88 and 188 fixed to the respective shafts 80 and 180 and meshing with one another.

Assuming now that it is desired to drive the output element 64 to rotate in the reverse direction, pressurized fluid is fed into passage 83, where it flows through the bores 86 of shaft 80 to a chamber 136 defined between the clutch drum 88 and the piston 90. The admission of pressurized fluid into chamber 136 drives the piston 90 away from the drum 88, thus compressing the clutch plates 92 and 94 and coupling the pinion 82 to the shaft 80. Torque is then transferred from the pinion 82 to the gear 110 to drive the output shaft 66 and the output element 64 to rotate in the reverse direction. Transfer of torque from the pinion 82 to the gear 110 is terminated by decreasing the hydraulic pressure in passage 83 and chamber 136, thus permitting the piston 90 to return to its original position under the biasing force of spring 96 to decouple the clutch.

During torque transfer, tangential, parallel, and separating (radial) loads are imposed on the pinion 82 by the gear 110. These loads are transmitted in part to housing 76 through the bearing 114 and in part to the shaft 80 through the bearing 116. Loads imposed on the shaft 80 by the bearing 116 are transmitted to the housing 76 at the shaft end 80A through the bearings 120 and 114 and at the shaft end of 80B through the bearing 118.

Assuming now that it is desired to drive the output element 64 to rotate in a forward direction, pressurized fluid is fed into passage 183 and through the bores 186 in shaft 180 to a chamber 236 defined between the clutch drum 188 and the piston 190. The admission of pressurized fluid into chamber 236 drives the piston 190 away from the drum 188, thus compressing the clutch plates 192 and 194 and coupling the pinion 182 to the shaft 180. Torque is then transferred from the pinion 182 to the gear 110 to drive the output shaft 66 and the output element 64 to rotate in the forward direction. Loads imposed on the pinion 182 by the gear 110 are transmitted in part to housing 76 through the bearing 214 and in part to the shaft 180 through the bearing 216. Loads imposed on the shaft 180 by the bearing 216 are transmitted to the housing 76 at the end 180A through the bearings 220 and 214 and at the end of 180B through the bearing 218.

The use of the inventive bearing arrangement significantly reduces deflection and bending moments on each of the shafts 80 and 180. In fact, it has been determined that when loads are imposed on either of the pinions 82 or 182 by delivering torque from the shafts 80, 180 to the output shaft 66 under 425 hp at 1800 rpm and in a reduction ratio of 6:1, the shafts 80, 180 deflect a maximum of 0.00039" and undergo a maximum bending moment of 3696 lb-in. Drive shafts heretofore available of the same dimensions and subject to the same loads typically deflect a maximum of 0.0014" and undergo a maximum bending moment of 10,079 lb-in. It can thus be seen that the inventive arrangement greatly reduces shaft deflections and bending moments and thus significantly alleviates the accompanying drawbacks.

Referring again to FIG. 4, the maximum deflection and bending moment of the shaft 80 could be reduced still further by moving the second bearing 116 further towards the rear end 80B of shaft 80 thus decreasing further the distance between points 128 and 134. Such a construction can be achieved by positioning the return spring for the clutch proximate an outer surface of the clutch. One such system will now be described.

Construction and Operation of Second Embodiment

Figure 5:
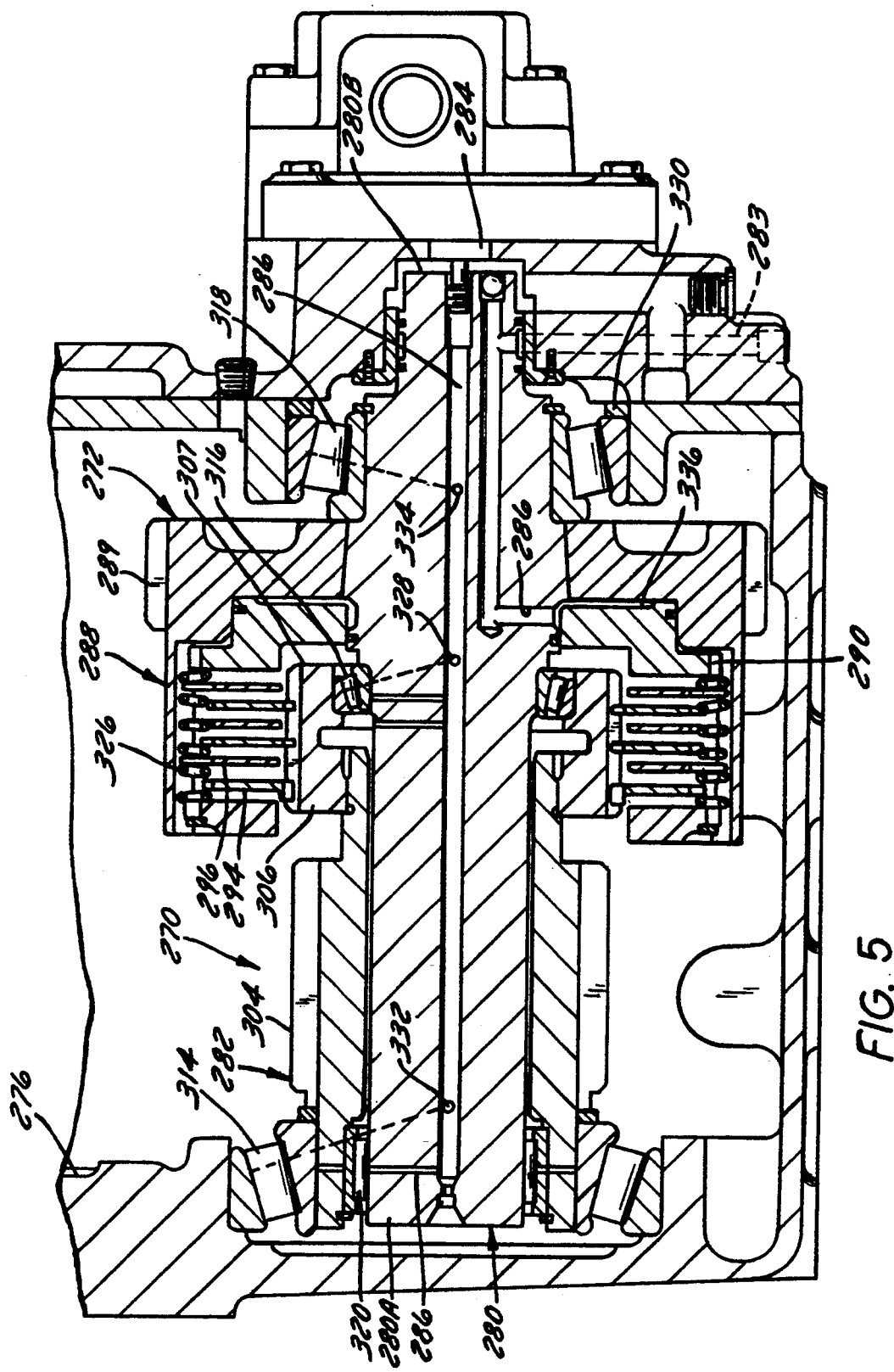
FIG. 5 is a sectional elevation view corresponding to FIG. 4 and illustrating a marine transmission constructed in accordance with a second embodiment of the present invention.

Referring now to FIG. 5, a reverse drive system 270 is illustrated which is usable in the marine transmission 60 of FIGS. 1-4 and which is similar in construction and operation to the reverse drive system 70. Elements in drive system 270 corresponding to those of the system 70 described above have thus been designated by the same reference numerals incremented by 200. More specifically, drive system 270 includes a drive shaft 280, a clutch 272, and a pinion 282. The pinion 282 and shaft 280 are mounted in a transmission housing 276 by first through fourth bearings 314, 316, 318, and 320 arranged as described above with respect to the first embodiment. The running clearances of bearings 314, 316, and 318 are adjusted by a single shim pack 330. Drive system 270 is operable, upon actuation of clutch 272, to transmit torque from a drive spider (not shown), through the shaft 280, clutch 272, pinion 282, and to an output shaft (not shown) corresponding to shaft 66 of the first embodiment. A separate drive system (not shown), corresponding to the forward drive system 68 of the first embodiment, is provided to drive the output shaft in a forward direction.

The embodiment of FIG. 5 differs from that of FIGS. 1-4 described above primarily in that the positions of the clutch return spring and second bearing have been altered. More specifically, the pinion 282, like the pinion 82 of the first embodiment, has a second end portion 306 on the outer periphery of which the clutch plates 294 are mounted and the inner periphery of which supports the second bearing 316. However, the chamber of the previous embodiment has been eliminated so that the bearing 316 could be positioned at the rear edge 307 of the second end portion 306. This permits the point 328, at which loads are effectively imposed on the shaft 280 from the pinion 282, to be moved further towards the point 334 at which loads are effectively absorbed of the shaft. Elimination of the chamber is made possible by positioning the return spring 326 proximate an outer surface of clutch drum 288 such that it engages an outer radial portion of piston 290.

In use, shaft 280 is normally driven to rotate by the transfer of torque from the forward drive shaft (not shown) to the drum 288 of clutch 272. When it is desired to drive the output shaft to rotate in a reverse direction, clutch 272 is actuated by admitting pressurized fluid into a passage 283 and through a bore 286 in shaft 280 and into a chamber 336 formed between the piston 290 and the drum 288 of the clutch 272. This pressurized fluid drives the piston 290 to slide, against the force of spring 326, to compress the clutch plates 294 and 296, thus coupling the pinion 282 to the shaft 280 and driving the output element to rotate. Lubricating oil is likewise supplied from a chamber 284. As in the first embodiment, loads imposed on the pinion 282 are transferred in part directly to the housing 276 by bearing 314 and in part to the shaft 280 by bearing 316. The loads imposed on the shaft 280 by the bearing 316 are transferred to the housing 276 through the bearings 318 and 320. Because the distance between the point 328 on which the load from the bearing 316 is effectively imposed on the shaft 280 and the point 334 on which the reaction load from the bearing 318 is effectively imposed on the shaft 280 is relatively small, deflections of and bending moments imposed on the shaft 280 are significantly reduced for a given load.

Many changes and modifications could be made to the present invention without departing from the spirit and scope thereof. For instance, the inventive bearing arrangement need not be used in a marine transmission but could be used in any application in which a gear such as a pinion is rotatably supported on a shaft and in which deflections and bending moments imposed on a shaft are to be minimized. The scope of such changes will become apparent from the appended claims.

I claim:

1. A marine gear train comprising:
   A. a housing;
   B. a rotatable drive shaft at least partially disposed in said housing;
   C. a pinion disposed around said drive shaft; and
   D. a bearing arrangement via which said pinion is
      (1) partially supported on said drive shaft, and
      (2) partially supported directly in said housing; said bearing arrangement including
      (A) a first taper roller bearing disposed between said pinion and said housing and rotatably supporting said pinion in said housing;
      (B) a second taper roller bearing disposed between said pinion and said drive shaft and rotatably supporting said pinion on said drive shaft;
      (C) a third bearing disposed between a second end of said drive shaft and said housing and rotatably supporting said drive shaft in said housing; and
      (D) a fourth bearing supporting a first end of said drive shaft in said housing.

2. A gear train as defined in claim 1, wherein said fourth bearing is disposed between said first end of said drive shaft and said pinion and rotatably supports said drive shaft in said housing through said pinion and said first bearing.

3. A gear train as defined in claim 2, wherein said third bearing is a single taper roller bearing.

4. A gear train as defined in claim 3, further comprising a single shim pack which adjusts the running clearances of said first, second, and third bearings.

5. A transmission for transmitting torque from a drive spider to an output shaft, said transmission comprising:
   A. a housing; and
   B. a first drive system disposed in said housing and selectively coupling said drive spider to said output shaft to drive said output shaft in a first direction, said first drive system including
      (1) a drive shaft which is disposed in said housing and which is coupled to said drive spider;
      (2) a pinion which is positioned around said drive shaft;
      (3) a clutch which selectively transmits torque from said drive shaft to said pinion, said clutch including a drum and a clutch stack formed from opposed plates which are connected to said drum and to said pinion, respectively, a hydraulically actuated piston which is slidable to compress said clutch stack, thereby engaging said clutch, and a return spring for biasing said piston towards a position disengaging said clutch;
      (4) a driven gear which is coupled to said output shaft and which meshes with said pinion so as to transmit torque from said pinion to said output shaft upon engagement of said clutch; and
      (5) a bearing arrangement including
      (A) a first taper roller bearing disposed between said pinion and said housing and rotatably supporting said pinion directly in said housing, and
      (B) a second taper roller bearing disposed between said pinion and said drive shaft and rotatably supporting said pinion on said drive shaft.

6. A transmission for transmitting torque from a drive spider to an output shaft, said transmission comprising:
   A. a housing; and
   B. a first drive system disposed in said housing and selectively coupling said drive spider to said output shaft to drive said output shaft in a first direction, said first drive system including
      (1) a drive shaft which is disposed in said housing and which is coupled to said drive spider;
      (2) a pinion which is positioned around said drive shaft;
      (3) a clutch which selectively transmits torque from said drive shaft to said pinion;
      (4) a driven gear which is coupled to said output shaft and which meshes with said pinion so as to transmit torque from said pinion to said output shaft upon engagement of said clutch; and
      (5) a bearing arrangement including
      (A) a first taper roller bearing disposed between said pinion and said housing and rotatably supporting said pinion directly in said housing,
      (B) a second taper roller bearing disposed between said pinion and said drive shaft and rotatably supporting said pinion on said drive shaft,
      (C) a third taper roller bearing disposed between said drive shaft and said housing and rotatably supporting said drive shaft in said housing, and
      (D) a fourth bearing disposed between said drive shaft and said pinion and rotatably supporting said drive shaft in said housing through said pinion and said first taper roller bearing.

7. A transmission as defined in claim 6, wherein said first and third taper roller bearings present included angles opening toward one another.

8. A transmission as defined in claim 6, further comprising a single shim pack which adjusts the running clearances of said first, second, and third bearings.

9. A transmission as defined in claim 5, wherein
   A. said pinion is elongated and has a first end portion positioned adjacent an end wall of said housing and a second end portion supporting a portion of said clutch,
   B. said first bearing is positioned between an outer radial periphery of said first end portion of said pinion and said housing, and
   C. said second bearing is located between an inner radial periphery of said second end portion of said pinion and an outer radial periphery of said drive shaft.

10. A transmission as defined in claim 9, wherein said second end portion of said pinion is cantilevered to define a chamber between said inner radial periphery of said pinion and said outer radial periphery of said drive shaft, said chamber having inner and outer longitudinal ends receiving said second bearing and said return spring, respectively.

11. A transmission as defined in claim 9, wherein said return spring is positioned proximate an outer surface of said clutch and said second bearing is positioned proximate an outer longitudinal end of said second end portion of said pinion.

12. A transmission as defined in claim 5, further comprising a second drive system disposed in said housing and selectively coupling said drive spider to said output shaft to drive said output shaft to rotate in a second direction, said second drive system including
   (1) a drive shaft which is disposed within said housing and which is coupled to said drive spider;
   (2) a pinion which is positioned around said drive shaft;
   (3) a clutch which selectively transmits torque from said drive shaft to said pinion;
   (4) a driven gear which is fixed to said output shaft and which meshes with said pinion so as to transmit torque from said pinion to said output shaft upon actuation of said clutch; and
   (5) a bearing arrangement including
      (A) a first taper roller bearing disposed between said pinion and said housing and rotatably supporting said pinion in said housing, and
      (B) a second taper roller bearing disposed between said pinion and said drive shaft and rotatably supporting said pinion on said drive shaft.

13. A transmission as defined in claim 12, wherein the bearing arrangement for the second drive system further includes
   A. a third taper roller bearing disposed between said drive shaft of the second drive system and said housing and rotatably supporting said drive shaft of the second drive system in said housing, and
   B. a fourth bearing disposed between said drive shaft of the second drive system and said pinion of the second drive system and rotatably supporting said drive shaft of the second drive system in said housing through said pinion of the second drive system and said first taper roller bearing.

14. A transmission as defined in claim 13, wherein said first and third taper roller bearings present included angles opening toward one another.

15. A gear train comprising:
   A. a housing;
   B. a rotatable drive shaft;
   C. a pinion which is disposed around said drive shaft and which is rotatable with respect to said drive shaft;
   D. a bearing arrangement rotatably supporting said pinion and said drive shaft in said housing, said bearing arrangement including first, second, and third axially spaced taper roller bearings, wherein
      (1) said first taper roller bearing is disposed between said pinion and said housing and rotatably supports said pinion in said housing,
      (2) said second taper roller bearing is disposed between said pinion and said drive shaft and rotatably supports said pinion on said drive shaft, and
      (3) said third taper roller bearing is disposed between said drive shaft and said housing and rotatably supports said drive shaft in said housing; and
   E. a single shim pack which engages one of said first and third taper roller bearings and which adjusts the running clearances of all of said first, second, and third taper roller bearings.

16. A gear train comprising:
   A. a housing;
   B. a rotatable drive shaft at least partially disposed in said housing and having first and second ends;
   C. a pinion disposed around said drive shaft; and
   D. a bearing arrangement via which said pinion and said drive shaft are supported in said housing, said bearing arrangement including
      (1) a first bearing disposed between said pinion and said housing and rotatably supporting said pinion in said housing proximate said first end of said drive shaft,
      (2) a second bearing disposed between said pinion and said drive shaft and rotatably supporting said pinion on said drive shaft between said first and second ends thereof,
      (3) a third bearing disposed proximate said second end of said drive shaft and rotatably supporting said drive shaft in said housing, and
      (4) a fourth bearing disposed proximate said first end of said drive shaft and supporting said drive shaft in said housing, wherein said second bearing comprises a taper roller bearing oriented so as to shift radial loads imposed on said bearing by said pinion towards said second end of said drive shaft.

17. A gear train as defined in claim 16, wherein said third bearing is a tapered bearing oriented so as to shift radial reaction loads imposed on said shaft by said housing away from said second end of said shaft.

18. A gear train comprising:
   A. a housing;
   B. a rotatable drive shaft at least partially disposed in said housing and having first and second ends;
   C. a pinion disposed around said drive shaft between said first and second ends of said drive shaft;
   D. a first bearing disposed between a first end portion of said pinion and said housing and rotatably supporting said pinion in said housing;
   E. a second bearing disposed between a second end portion of said pinion and said drive shaft and rotatably supporting said pinion on said drive shaft;
   F. a third bearing disposed between said second end of said drive shaft and said housing and rotatably supporting a second end of said drive shaft in said housing; and
   G. a fourth bearing rotatably supporting said first end of said drive shaft in said housing.

19. A Sear train as defined in claim 18, wherein said first and second bearings are taper roller bearings.

20. A marine gear train comprising:
A. a housing;
B. a rotatable drive shaft at least partially disposed in said housing;
C. a pinion disposed around said drive shaft;
D. a first, taper roller bearing disposed between a first end portion of said pinion and said housing and rotatably supporting said pinion in said housing;
E. a second, taper roller bearing disposed between a second end portion of said pinion and said drive shaft and rotatably supporting said pinion on said drive shaft;
F. a third, taper roller bearing disposed between a second end portion of said drive shaft and said housing and rotatably supporting said drive shaft in said housing; and
G. a fourth bearing rotatably supporting a first end portion of said drive shaft in said housing.

21. A gear train as defined by claim 20, wherein said fourth bearing is disposed between said first end portion of said shaft and said first end portion of said pinion and transfers loads from said shaft to said housing through said pinion and said first bearing.

22. A transmission for transmitting torque from a drive spider to an output shaft, said transmission comprising:
A. a housing; and
B. a drive system disposed in said housing and selectively coupling said drive spider to said output shaft to drive said output shaft in a first direction, said drive system including
(1) a drive shaft which is disposed in said housing and which is coupled to said drive spider, said drive shaft having first and second axial end portions;
(2) a pinion which is positioned around said drive shaft and which has first and second axial end portions;
(3) a clutch which selectively transmits torque from said drive shaft to said pinion;
(4) a driven gear which is coupled to said output shaft and which meshes with said pinion so as to transmit torque from said pinion to said output shaft upon actuation of said clutch; and
(5) a bearing arrangement including
(A) a first, taper roller bearing disposed between said first end portion of said pinion and said housing and rotatably supporting said pinion directly in said housing,
(B) a second, taper roller bearing disposed between said second end portion of said pinion and said drive shaft and rotatably supporting said pinion on said drive shaft,
(C) a third, taper roller bearing disposed between said second end portion of said drive shaft and said housing and rotatably supporting said drive shaft in said housing, and
(D) a fourth bearing rotatably supporting said first end portion of said drive shaft in said housing.

23. A transmission as defined in claim 22, wherein said fourth bearing is disposed between said first end portion of said drive shaft and said first end portion of said pinion and rotatably supports said dirve shaft in said housing through said pinion and said first taper roller bearing.

24. A gear train comprising:
A. a housing;
B. a rotatable drive shaft at least partially disposed in said housing;
C. a pinion disposed around said drive shaft;
D. a bearing arrangement including
(1) a first bearing disposed between said pinion and said housing and rotatably supporting said pinion in said housing,
(2) a second bearing disposed between said pinion and said drive shaft and rotatably supporting said pinion on said drive shaft; and
E. a clutch including
(1) a drum coupled to said drive shaft,
(2) a clutch stack formed from opposed plates connected to said drum and to said pinion, respectively,
(3) a hydraulically actuated piston which is slidable to compress said clutch stack, thereby engaging said clutch, and
(4) a return spring for biasing said piston towards a position disengaging said clutch.

25. A gear train as defined in claim 24, wherein said bearing arrangement further includes
(1) a third bearing disposed between a second end of said drive shaft and said housing and rotatably supporting said drive shaft in said housing, and
(2) a fourth bearing supporting a first end of said drive shaft in said housing.

26. The gear train as defined in claim 25, wherein said first, second, and third bearings comprise taper roller bearings.

27. A gear train comprising:
A. a housing;
B. a rotatable drive shaft at least partially disposed in said housing;
C. a pinion disposed around said drive shaft; and
D. a bearing arrangement including
(1) a first bearing disposed between said pinion and said housing and rotatably supporting said pinion in said housing,
(2) a second bearing disposed between said pinion and said drive shaft and rotatably supporting said pinion on said drive shaft,
(3) a third bearing disposed between said drive shaft and said housing and rotatably supporting said drive shaft in said housing, and
(4) a fourth bearing supporting said drive shaft in said housing.

28. A gear train comprising:
A. a housing;
B. a rotatable drive shaft at least partially disposed in said housing;
C. a pinion disposed around said drive shaft; and
D. a bearing arrangement including
(1) a first bearing disposed between said pinion and said housing and rotatably supporting said pinion in said housing,
(2) a second bearing disposed between said pinion and said drive shaft and rotatably supporting said pinion on said drive shaft,
(3) a third bearing disposed between said drive shaft and said housing and rotatably supporting said drive shaft in said housing, and
(4) a fourth bearing supporting said drive shaft in said housing, wherein
said first bearing is disposed between a first end portion of said pinion and said housing, said second bearing is disposed between a second end portion of said pinion and said drive shaft, said fourth bearing is disposed between a first end portion of said drive shaft and said pinion, and said third bearing is disposed between a second end portion of said drive shaft and said housing.

29. A gear train as defined in claim 28, wherein said first, second, and third bearings comprise taper roller bearings.

* * * * *